US010649465B1

(12) United States Patent
Tang et al.

(10) Patent No.: US 10,649,465 B1
(45) Date of Patent: May 12, 2020

(54) SELF-DRIVING SYSTEMS

(71) Applicant: LINGDONG TECHNOLOGY (BEIJING) CO. LTD, Beijing (CN)

(72) Inventors: Wenqing Tang, Beijing (CN); Yaming Tang, Beijing (CN)

(73) Assignee: LINGDONG TECHNOLOGY (BEIJING) CO. LTD, Beijing (CN)

( * ) Notice: Subject to any disclaimer, the term of this patent is extended or adjusted under 35 U.S.C. 154(b) by 0 days.

(21) Appl. No.: 16/443,081

(22) Filed: Jun. 17, 2019

Related U.S. Application Data

(63) Continuation of application No. PCT/CN2019/090626, filed on Jun. 11, 2019.

(51) Int. Cl.
| | |
|---|---|
| *G05D 1/02* | (2020.01) |
| *H04N 5/247* | (2006.01) |
| *A45C 5/14* | (2006.01) |
| *A45C 13/26* | (2006.01) |
| *A45C 13/28* | (2006.01) |
| *A45C 5/03* | (2006.01) |

(52) U.S. Cl.
CPC ............. *G05D 1/0248* (2013.01); *A45C 5/03* (2013.01); *A45C 5/14* (2013.01); *A45C 13/262* (2013.01); *A45C 13/28* (2013.01); *G05D 1/0255* (2013.01); *H04N 5/247* (2013.01); *A45C 2013/267* (2013.01)

(58) Field of Classification Search
CPC ....... G10L 15/22; G10L 15/265; G10L 17/22; G10L 2015/223; G06F 3/167; H04M 2250/74; G05D 1/024; G05D 1/0255; A45C 13/266; A45C 5/14; A45C 13/28; A45C 5/03; A45C 2013/267; H04N 5/247
See application file for complete search history.

(56) References Cited

U.S. PATENT DOCUMENTS

| | | | | | |
|---|---|---|---|---|---|
| 4,913,252 | A | * | 4/1990 | Bartley | A45C 5/14 180/208 |
| 5,316,096 | A | * | 5/1994 | Good | A45C 5/14 180/19.1 |

(Continued)

OTHER PUBLICATIONS

MOPHIE Universal Belt Clip, Published Apr. 6, 2016, https://www.youtube.com/watch?v=IAg2ijW04fs.*

*Primary Examiner* — Abby Y Lin
*Assistant Examiner* — Martin A Weeks
(74) *Attorney, Agent, or Firm* — Patterson & Sheridan, L.L.P.

(57) ABSTRACT

Aspects of the present disclosure relate to self-driving luggage systems, devices, and components thereof, having multiple following modes. In one implementation, a self-driving system includes a piece of luggage. The piece of luggage includes one or more motorized wheels and an onboard ultra-wideband device. The onboard ultra-wideband device includes a control unit and one or more transceivers. The piece of luggage also includes one or more laser emitters configured to shoot light towards a target. The piece of luggage also includes one or more proximity cameras configured to take one or more images of the target, and the one or more images include light reflected off of the target. Each of the one or more proximity cameras includes an optical filter. The self-driving system also includes a central processing unit. The central processing unit is configured to switch between a vision following mode and a radio following mode.

22 Claims, 7 Drawing Sheets

(56) References Cited

U.S. PATENT DOCUMENTS

| | | | |
|---|---|---|---|
| 7,756,298 B2* | 7/2010 | Miyahara | G06K 9/00 |
| | | | 382/104 |
| 2004/0129469 A1* | 7/2004 | Kader | A45C 5/14 |
| | | | 180/167 |
| 2011/0106310 A1* | 5/2011 | Kawaguchi | B25J 13/00 |
| | | | 700/253 |
| 2011/0260848 A1* | 10/2011 | Rodriguez Barros | |
| | | | B60Q 1/2665 |
| | | | 340/438 |
| 2012/0273314 A1* | 11/2012 | Raymond | A45C 5/14 |
| | | | 190/18 A |
| 2012/0280793 A1* | 11/2012 | Fayfield | G08G 1/142 |
| | | | 340/8.1 |
| 2014/0107868 A1* | 4/2014 | DiGiacomcantonio | A45C 5/14 |
| | | | 701/2 |
| 2014/0277841 A1* | 9/2014 | Klicpera | A45C 5/14 |
| | | | 701/2 |
| 2017/0049202 A1* | 2/2017 | Nascimento | A45C 13/262 |
| 2017/0108860 A1* | 4/2017 | Doane | G05D 1/0212 |
| 2017/0123422 A1* | 5/2017 | Kentley | B60H 1/00735 |
| 2018/0367292 A1* | 12/2018 | Shi | H04W 76/10 |

* cited by examiner

SELF-DRIVING SYSTEMS

BACKGROUND

Field

Aspects of the present disclosure relate to self-driving luggage systems, devices, and components thereof, having multiple following modes.

Description of the Related Art

Some autonomous luggage systems have following systems that are used to follow a user as the user walks. As an example, autonomous luggage systems may follow a user as the user walks through airports, hotels, parking lots, on sidewalks, or in other environments. However, various obstructions and environmental factors may cause the following system to lose track of the user. As an example, the following system can be obstructed when there is a change in the lighting of the surrounding environment.

Therefore, there is a need for new and improved self-driving luggage systems that are able to follow a user through various obstructions and environmental factors.

SUMMARY

Aspects of the present disclosure relate to self-driving luggage systems, devices, and components thereof, having multiple following modes.

In one implementation, a self-driving system includes a piece of luggage. The piece of luggage includes one or more motorized wheels and an onboard ultra-wideband device. The onboard ultra-wideband device includes a control unit and one or more transceivers. The piece of luggage also includes one or more laser emitters configured to shoot light towards a target. The piece of luggage also includes one or more proximity cameras configured to take one or more images of the target, and the one or more images include light reflected off of the target. Each of the one or more proximity cameras includes an optical filter. The self-driving system also includes a central processing unit. The central processing unit is configured to switch between a vision following mode and a radio following mode. The central processing unit is also configured to determine a distance to the target, and generate instructions regarding a position of the piece of luggage. When the self-driving system is in the vision following mode, the central processing unit is configured to receive from the one or more proximity cameras one or more images of the target that include the light reflected off of the target. When the self-driving system is in the radio wave following mode, the central processing unit is configured to receive information from the onboard ultra-wideband device.

In one implementation, a self-driving system includes a piece of luggage. The piece of luggage includes one or more motorized wheels, and an onboard ultra-wideband device. The onboard ultra-wideband device includes a control unit and one or more transceivers. The piece of luggage also includes one or more lasers emitters configured to shoot light towards a target. The piece of luggage also includes one or more proximity cameras configured to take one or more images of the target, and the one or more images include light reflected off of the target. Each of the one or more proximity cameras also includes an optical filter. The self-driving system also includes a mobile ultra-wideband device. The mobile ultra-wideband device includes a housing and a transmitter. The transmitter transmits a signal to the one or more transceivers of the onboard ultra-wideband device. The mobile ultra-wideband device also includes a battery and a mounting clip. The self-driving system also includes a central processing unit. The central processing unit is configured to switch between a vision following mode and a radio following mode. The central processing unit is also configured to determine a distance to the target and generate instructions regarding a position of the piece of luggage. When the self-driving system is in the vision following mode, the central processing unit is configured to receive from the one or more proximity cameras one or more images of the target that include the light reflected off of the target. When the self-driving system is in the radio wave following mode, the central processing unit is configured to receive information from the onboard ultra-wideband device.

In one implementation, a self-driving system includes a piece of luggage. The piece of luggage includes one or more motorized wheels, and an onboard ultra-wideband device. The onboard ultra-wideband device includes a control unit and one or more transceivers. The piece of luggage also includes one or more laser emitters configured to shoot light towards a target. The piece of luggage also includes one or more proximity cameras configured to take one or more images of the target. The one or more images include light reflected off of the target. Each of the one or more proximity cameras includes an optical filter. The piece of luggage also includes a status indicator. The self-driving system also includes a central processing unit. The central processing unit is configured to switch between a vision following mode and a radio wave following mode. The central processing unit is also configured to determine a distance to the target, and generate instructions regarding a status of the piece of luggage. When the self-driving system is in the vision following mode, the central processing unit is configured to receive from the one or more proximity cameras one or more images of the target that include light reflected off of the target. When the self-driving system is in the vision following mode, the instructions generated by the central processing unit instruct the status indicator to emit a first light indicator. When the self-driving system is in the radio wave following mode, the central processing unit is configured to receive information from the onboard ultra-wideband device. When the self-driving system is in the radio wave following mode, the instructions generated by the central processing unit instruct the status indicator to emit a second light indicator that is different that the first light indicator.

BRIEF DESCRIPTION OF THE DRAWINGS

So that the manner in which the above recited features of the present disclosure can be understood in detail, a more particular description of the present disclosure, briefly summarized above, may be had by reference to implementations, some of which are illustrated in the appended drawings. It is to be noted, however, that the appended drawings illustrate only common implementations of the present disclosure and are therefore not to be considered limiting of its scope, for the present disclosure may admit to other equally effective implementations.

Figure 1A:
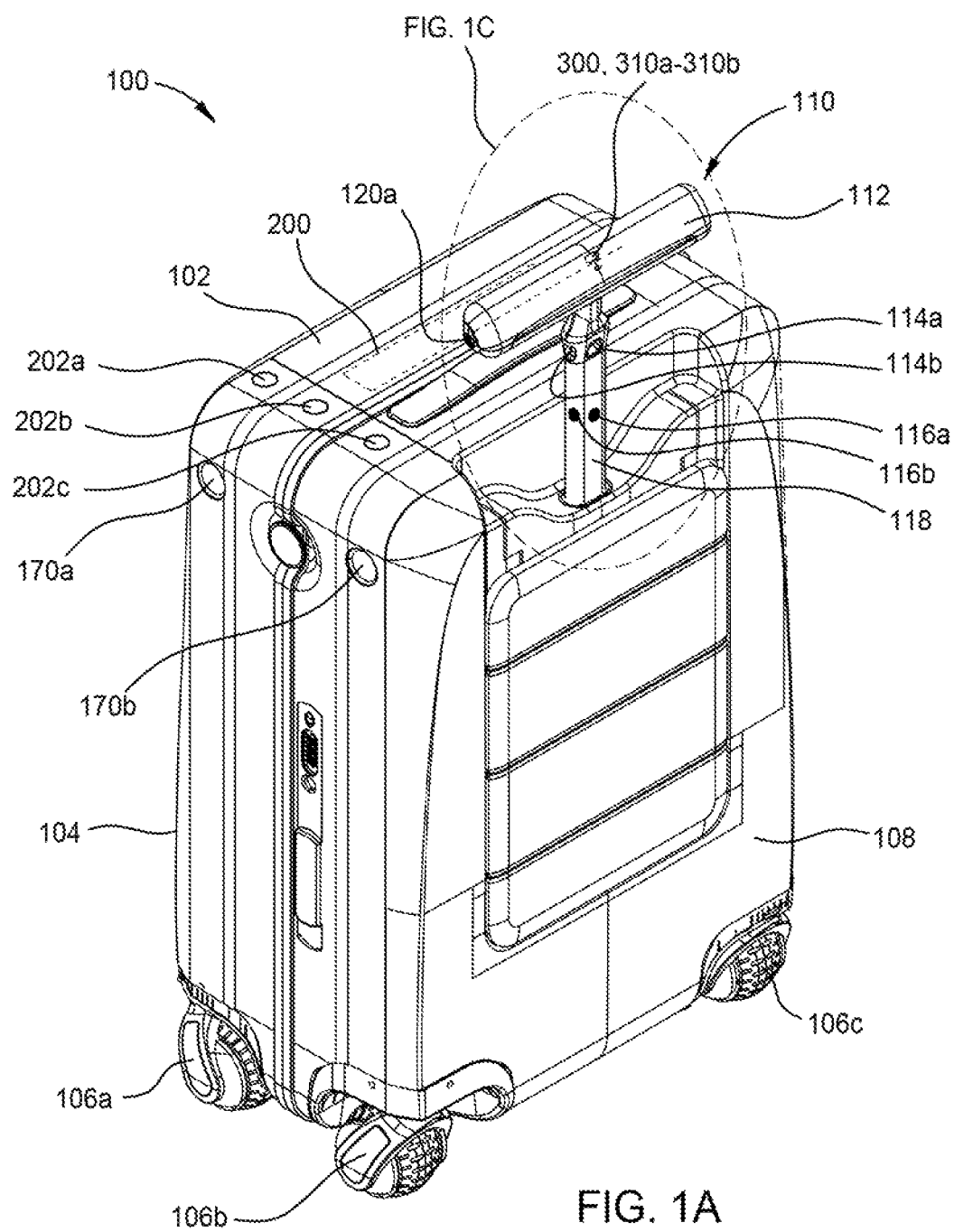
FIG. 1A illustrates a schematic isometric back view of a self-driving system, according to one implementation.

To facilitate understanding, identical reference numerals have been used, where possible, to designate identical elements that are common to the figures. It is contemplated that elements disclosed in one implementation may be beneficially utilized on other implementations without specific recitation.

DETAILED DESCRIPTION

Aspects of the present disclosure relate to self-driving luggage systems, devices, and components thereof, having multiple following modes. Although the embodiments of the self-driving systems are described and illustrated herein with respect to a luggage system, the embodiments may be used with other types of portable equipment.

Figure 1B:
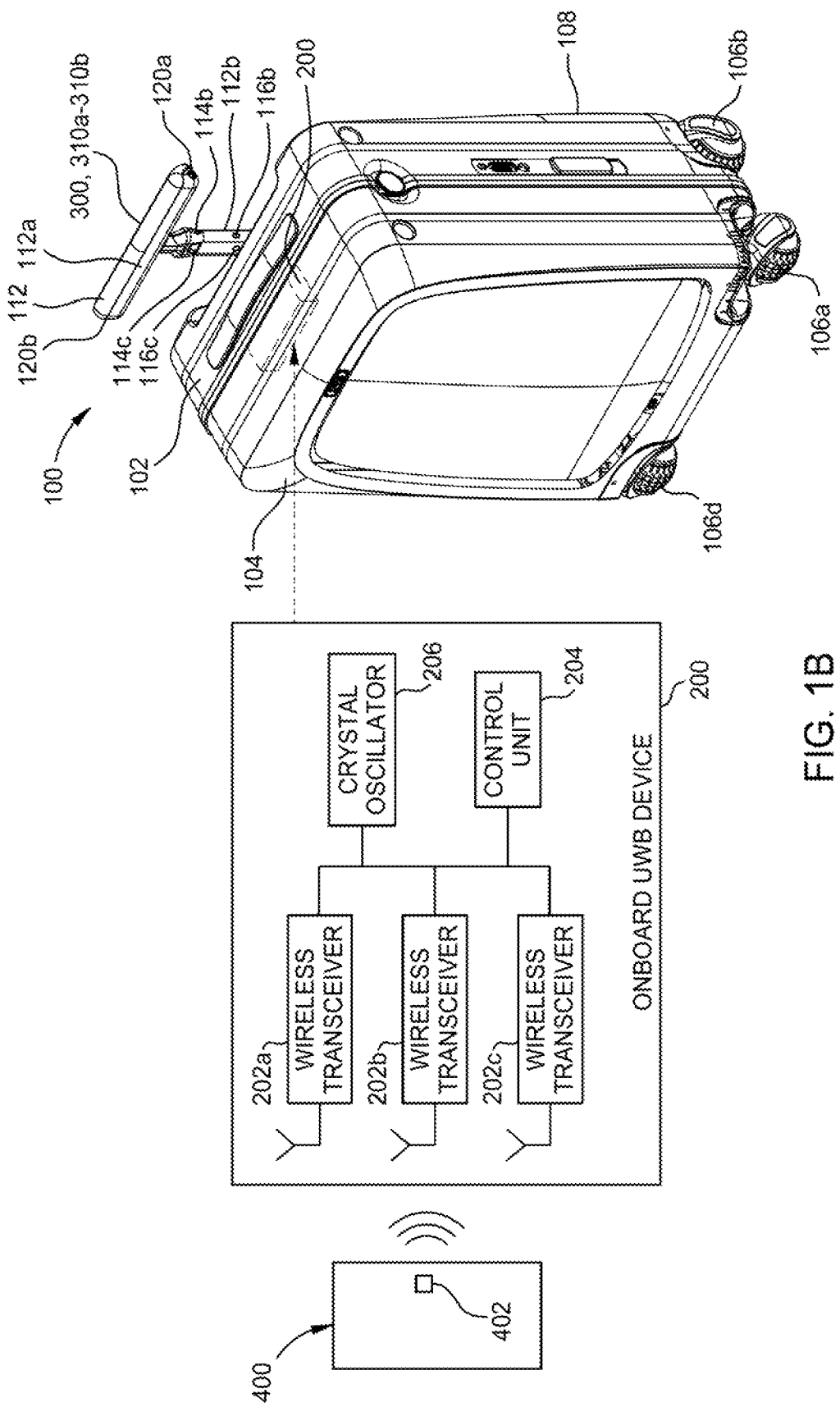
FIG. 1B illustrates a schematic isometric front view of the self-driving system illustrated in FIG. 1A, according to one implementation.

FIG. 1A illustrates a schematic isometric back view of a self-driving system 100, according to one implementation. The self-driving system 100 may be a smart luggage system. The self-driving system 100 includes a body in the form of a piece of luggage 102. The piece of luggage 102 may be a suitcase or travel case. The piece of luggage 102 is configured to store items and transport items. The piece of luggage 102 may be rectangular, square, hexagonal in shape, or any other shape suitable to store items for transport. The self-driving system 100 includes one or more motorized wheels 106a-106d (four are shown in FIGS. 1A and 1B) coupled to the bottom of the piece of luggage 102. Each motorized wheel 106a-106d rotates and rolls in a given direction. In one example, the luggage 102 is supported by two, three, four, or more motorized wheels, each configured to move the piece of luggage 102 in a given direction.

The self-driving system 100 includes a handle 110 coupled to the piece of luggage 102. The handle 110 is configured to allow a user of the self-driving system 100 to move, push, pull, and/or lift the piece of luggage 102. The handle 110 is located on a back side 108 of the luggage 102, but can be located on any side of the piece of luggage 102, such as on a front side 104 that opposes the back side 108. The handle 110 includes a pull rod 112 coupled to a connecting rod 118, which is coupled to the luggage 102. The pull rod 112 forms a "T" shape with, and telescopes within, the connecting rod 118. An upper portion 112a of the pull rod 112 is elongated an oriented horizontally and is perpendicular to a lower portion 112b. The lower portion 112b of the pull rod 112 is oriented vertically and is perpendicular to the upper portion 112a.

One or more cameras 120a, 120b are disposed on the upper portion 112a of the pull rod 112. The cameras 120a, 120b take photographs and/or videos of objects in a surrounding environment of the piece of luggage 102. In one example, the cameras 120a, 120b take photographs and/or videos of nearby targets and/or users. The one or more cameras 120a, 120b may be disposed on one or more outer elongated portions of the pull rod 112, and may face outwards from the piece of luggage 102.

The self-driving system 100 includes one or more proximity cameras 114a-114d (four are shown). The one or more proximity cameras 114a-114d are disposed on one or more of the pull rod 112 and/or the connecting rod 118 of the handle 110. The one or more proximity cameras 114a-114d are disposed on the lower portion 112b of the pull rod 112. In one example, one of the four proximity cameras 114a-114d is coupled to one of four sides of the lower portion 112b of the pull rod 112. In one example, each one of the four proximity cameras 114a-114d corresponds to one or four sides of the piece of luggage 102. Each of the proximity cameras 114a-114d is configured to take images of a target so that the self-driving system 100 can determine a distance of the target relative to the piece of luggage 102. Each of the proximity cameras 114a-114d includes a wide-angle lens. Images taken by a proximity camera 114a-114d having a wide-angle lens include one or more targets such that the larger a target appears in the image, the farther it is from the piece of luggage 102 and the proximity camera 114a-114d that took the image.

The self-driving system 100 includes one or more laser emitters 116a-116d disposed on the lower portion 112b of the pull rod 112 and below the proximity cameras 114a-114d. Each of the four laser emitters 116a-116d corresponds to one of the four proximity cameras 114a-114d. Each laser emitter 116a-116d is disposed on the same side of the lower portion 112b of the pull rod 112 as the corresponding one of the proximity cameras 114a-114d. Each laser emitted 116a-116d is disposed on one of the four sides of the lower portion 112b of the pull rod 112. Each of the laser emitters 116a-116d is configured to shoot light (such as lasers) in an outward direction from the lower portion 112b of the pull rod 112 and towards one or more targets (such as a user). The light emitted by the laser emitters 116a-116d reflects off of the one or more targets. The light emitted by the laser emitters 116a-116d is invisible to the human eye. Each of the proximity cameras 114a-114d includes an optical filter to identify the light emitted from the laser emitters 116a-116d and reflected off of a target to facilitate determining the proximity of the target relative to the piece of luggage 102. The proximity cameras 114a-114d are configured to take an image of a target that includes light emitted from a respective one of the laser emitters 116a-116d and reflected off of the target. Images taken by a proximity camera 114a-114d having a wide-angle lens include one or more targets and reflected light such that the higher the reflected light appears in the image, the farther the target is from the piece of luggage 102 and the proximity camera 114a-114d that took the images.

The self-driving system 100 includes one or more proximity sensors 170a, 170b disposed on the piece of luggage 102. Two proximity sensors 170a, 170b are shown coupled to a side of the luggage 102 adjacent to a top end of the piece of luggage 102. Any number of proximity sensors 170a, 170b can be used and located at different positions and/or on any side of the piece of luggage 102. The proximity sensors 170a, 170b are configured to detect the proximity of one or more objects. In one example, the proximity sensors 170a, 170b detect the proximity of a user. In one example, the proximity sensors 170a, 170b detect the proximity of objects other than the user, to facilitate the piece of luggage 102 avoiding the objects as the piece of luggage 102 follows the user.

The proximity sensors 170a, 170b include one or more of ultrasonic sensors, sonar sensors, infrared sensors, radar sensors, and/or LiDAR sensors. The proximity sensors 170a, 170b may work with the cameras 120a, 120b, the proximity cameras 114a-114d, and/or the laser emitters 116a-116d to facilitate the piece of luggage 102 avoiding obstacles (such as objects other than the user) as the piece of luggage 102 tracks and follows the user. Obstacles may include other people or objects in the travel path of the luggage 102 when moving in a rear following position or a side following position relative to the user. When an obstacle is identified, the self-driving system 100 will take corrective action to move the piece of luggage 102 and avoid a collision with the obstacle based on the information received from the self-driving system 100 components, such as one or more of the proximity sensors 170a, 170b, the cameras 120a, 120b, the proximity cameras 114a-114d, and/or the laser emitters 116a-116d.

FIG. 1B illustrates a schematic isometric front view of the self-driving system 100 illustrated in FIG. 1A, according to one implementation. The self-driving system 100 includes an onboard ultra-wideband ("UWB") device 200 and a mobile ultra-wideband device 400. The onboard ultra-wideband device 200 is disposed on the piece of luggage 102. In one example, the onboard ultra-wideband device 200 is located inside and on a top end of the piece of luggage 102 to continuously communicate with a transmitter 402 of the mobile ultra-wideband device 400. The onboard ultra-wideband device 200 is located on the top end of the piece of luggage 102 and closer toward the front side 104 of the piece of luggage 102 (the side opposite from the handle 110) rather than the back side 108. In one example, the onboard ultra-wideband device 200 is secured within a plastic housing that is coupled to the inside of the luggage 102 at the top end on the front side 104.

The onboard ultra-wideband device 200 has a positioning device that includes a control unit 204 and one or more transceivers 202a, 202b, 202c (three are shown). In one example, the control unit 204 is a central processing unit. The onboard ultra-wideband device 200 includes a crystal oscillator 206. The crystal oscillator 206 is an electronic oscillator circuit that uses the mechanical resonance of a vibrating crystal of piezoelectric material to create an electric signal. The electric signal has a frequency that is used to keep track of time to provide a stable clock signal. The transceivers 202a, 202b, 202c share the same crystal oscillator 206 so that they each have the exact same stable clock signal. In one example, the transceivers 202a, 202b, 202c determine from which side a transmitter 402 of a mobile ultra-wideband device 400 is located by calculating the time difference of arrival based on the arrival time of the signal from the transmitter 402 as detected by each one transceiver 202a, 202b, 202c relative to each other transceiver 202a, 202b, 202c. The one or more transceivers 202a, 202b, 202c may be antennas configured to receive one or more signals, such as radio wave signals, from the mobile ultra-wideband device 400. The one or more transceivers 202a, 202b, 202c may be disposed within the onboard ultra-wideband device 200 (as illustrated in FIG. 1B). In one example, the one or more transceivers 202a-202c may be coupled to a top of the piece of luggage 102 (as illustrated in FIG. 1A).

In one embodiment, which can be combined with other embodiments, the onboard ultra-wideband device 200 determines the angle of arrival of a signal transmitted by the transmitter 402 of the mobile ultra-wideband device 400 to determine the position of a user relative to the luggage 102. The control unit 204 and the crystal oscillator 206 continuously calculate the angle at which the transmitter 402 is located relative to two of the three transceivers 202a, 202b, and 202c. The self-driving system 100 is configured to determine the position of the piece of luggage 102 relative to the mobile ultra-wideband device 400 using (1) the proximity of the transmitter 402 as continuously calculated by the onboard ultra-wideband device 200 using the angle of arrival calculation, and (2) the location of the transmitter 402 as continuously calculated by the onboard ultra-wideband device 200 using the time difference of arrival calculation. When a user includes or wears the mobile ultra-wideband device 400, the self-driving system 100 is configured to determine a position of the piece of luggage relative to the user.

In one example, the transmitter 402 is integrated into the mobile ultra-wideband device 400. The transmitter 402 may be in the form of hardware disposed within the mobile ultra-wideband device 400 and/or software programmed into the mobile ultra-wideband device 400. In FIG. 1B, the mobile ultra-wideband device 400 is shown as a user-wearable belt clip device, but the mobile ultra-wideband device 400 may also be a cellular phone, a tablet, a computer, and/or any other device that can communicate with the onboard ultra-wideband device 200 (such as by using a transmitter 402).

Figure 1C:
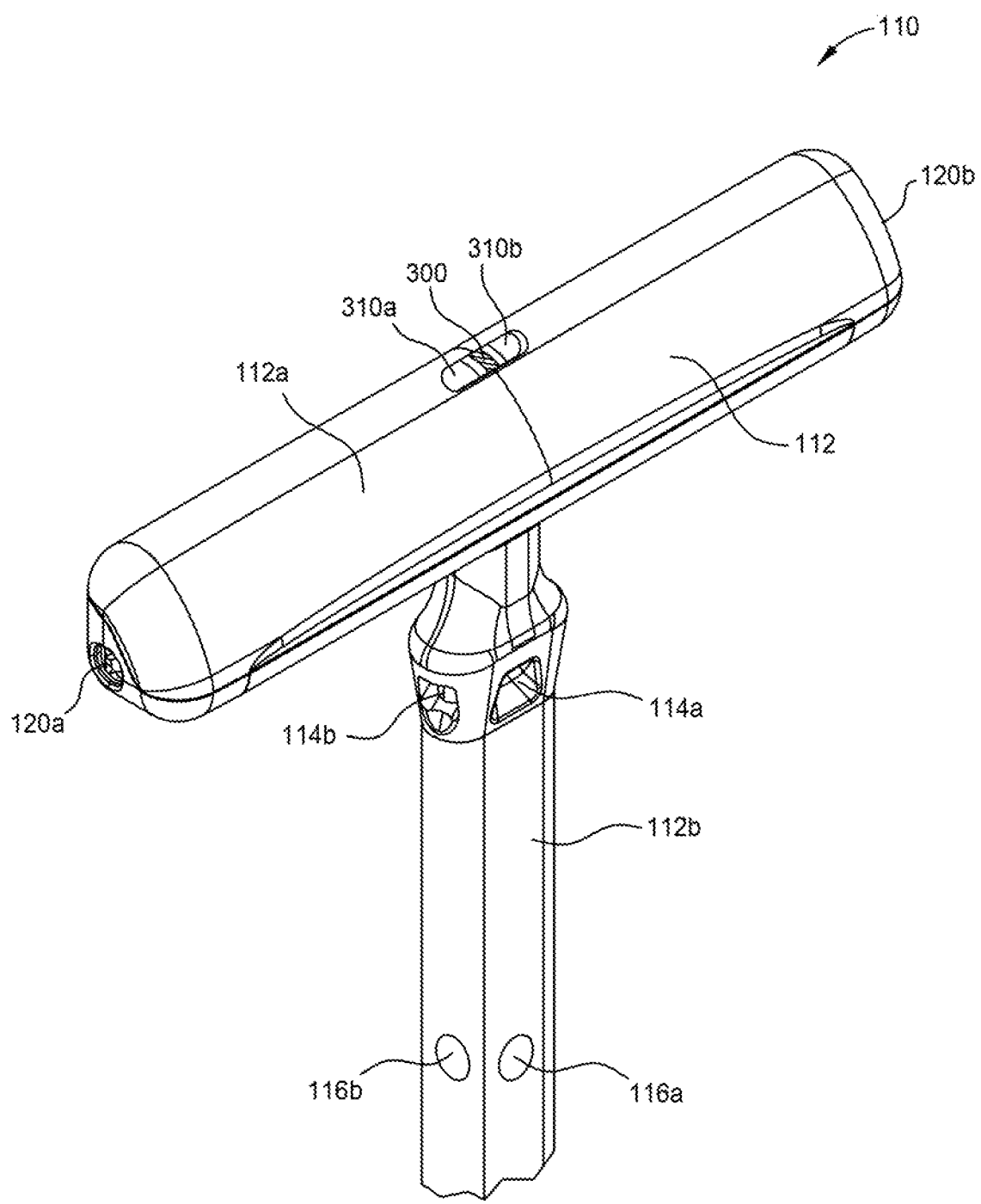
FIG. 1C is an enlarged schematic view of a handle of the self-driving system illustrated in FIGS. 1A and 1B, according to one implementation.

FIG. 1C is an enlarged schematic view of the handle 110 illustrated in FIGS. 1A and 1B, according to one implementation. The handle 110 includes a status indicator 300 and one or more infrared sensors 310a, 310b (two are shown). The status indicator 300 and the infrared sensors 310a, 310b are disposed adjacent to an upper end of the upper portion 112a of the pull rod 112 and adjacent to a center of the upper portion 112a of the pull rod 112. The status indicator 300 is disposed adjacent to, and between, the two infrared sensors 310a, 310b. The status indicator 300 includes a light-emitting diode (LED). The infrared sensors 310a, 310b are disposed to detect a hand of a user when the hand is close to, or gripping, the upper portion 112a of the pull rod 112 of the handle 110.

Figure 2A:
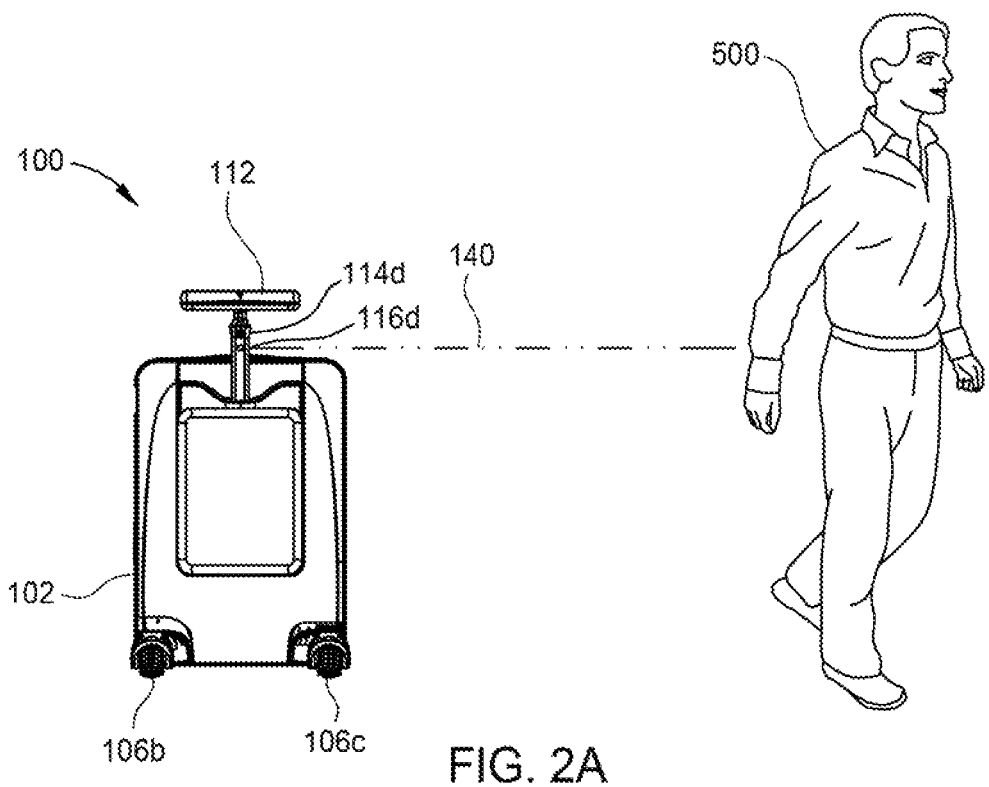
FIG. 2A illustrates a schematic side view of a self-driving system following a user in a vision following mode, according to one implementation.
Figure 2B:
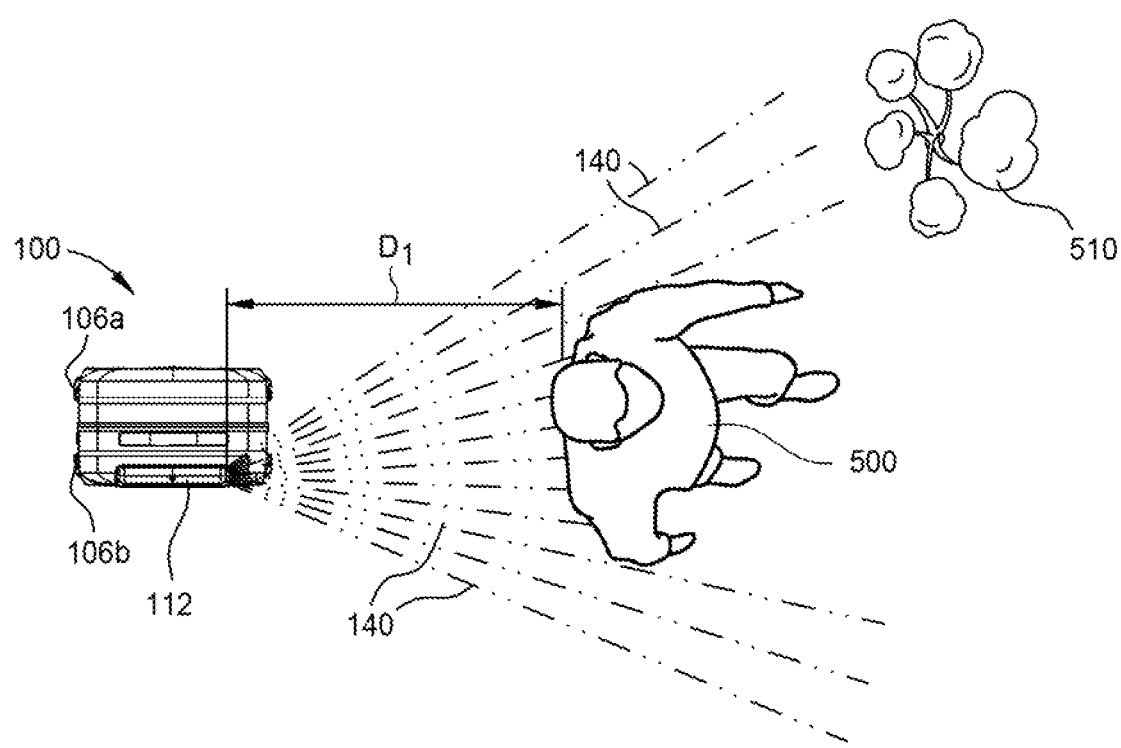
FIG. 2B illustrates a schematic top view of a self-driving system following a user in a vision following mode, according to one implementation.

FIG. 2A illustrates a schematic side view of the self-driving system 100 following a user 500 in a vision following mode, according to one implementation. FIG. 2B illustrates a schematic top view of the self-driving system 100 following the user 500 in the vision following mode, according to one implementation. When the self-driving system 100 is in the vision following mode, one or more laser emitters 116a-116d emit one or more flat beams of light 140 towards a user 500 and an object 510. The proximity cameras 114a-114d take one or more images of the user 500 and/or the object 510. The one or more beams of light 140 reflect off of the user 500 and/or the object 510 to create first and second horizontal lines 142, 143, respectively, of the reflected light (illustrated in FIG. 2C). The one or more images taken by the proximity cameras 114a-114d include a target (such as the user 500), an object (such as the object 510), and light reflected off of the user 500 and the object 510 (such as horizontal lines). The one or more proximity cameras 114a-114d continuously take images (such as the image 150 described below) of the user 500 and the surrounding object 510.

Figure 2C:
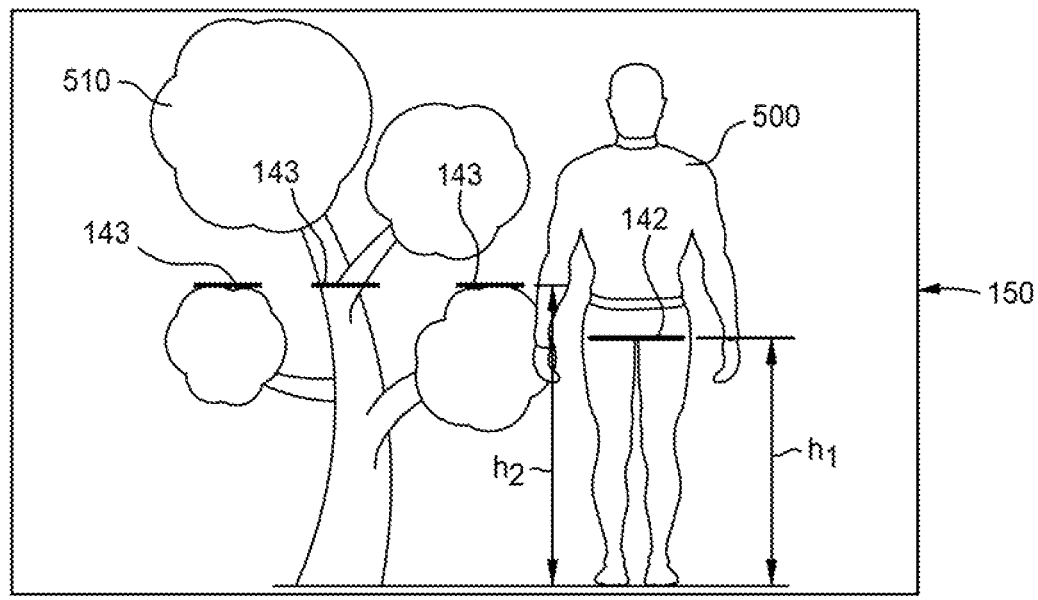
FIG. 2C is an enlarged view of an image of a target taken by a camera, according to one implementation.

FIG. 2C is an enlarged view of an image 150 of a target taken by a camera, according to one implementation. The image 150 includes the first and second horizontal lines 142, 143 of light being reflected off of the user 500 and the object 510, respectively. The first horizontal line 142 of light reflected off of the user 500 includes a first height $h_1$. The second horizontal line 143 of light reflected off of the object 510 includes a second height $h_2$. In the vision following mode, the self-driving system 100 determines a distance $D_1$ of the user 500 relative to the piece of luggage 102 by calculating the first height $h_1$ of the first horizontal line 142 of light reflected off of the user 500. The higher the first height $h_1$ and/or the second height $h_2$ are in the image, the farther the user 500 and/or the object 510 are from the piece of luggage 102. In response to the images taken by the proximity cameras 114a-114d, the self-driving system 100 instructs one or more motorized wheels 106a-106d to move the luggage 102 in a given direction, such as in a given direction towards the user 500. In an example where the position of the user 500 relative to the piece of luggage 102 is determined by the self-driving system 100, the self-driving system 100 will continuously track and follow the user 500 in a rear following position or a side following position in vision following mode. In one embodiment, which can be combined with other embodiments, the laser emitters 116a-116d emit light towards a plurality of targets (such as the user 500 and the object 510). The self-driving system 100 instructs the piece of luggage 102 to follow the target (such as the user 500) that has the smallest height of a horizontal line of reflected light off of that target (such as the first height $h_1$ of the first horizontal line 142 that is less than the second height $h_2$). In one example, the self-driving system 100 instructs the one or more motorized wheels 106a-106d to move the luggage 102 in a given direction towards the target having the smallest height of a horizontal line of reflected light off of that target.

Figure 2D:
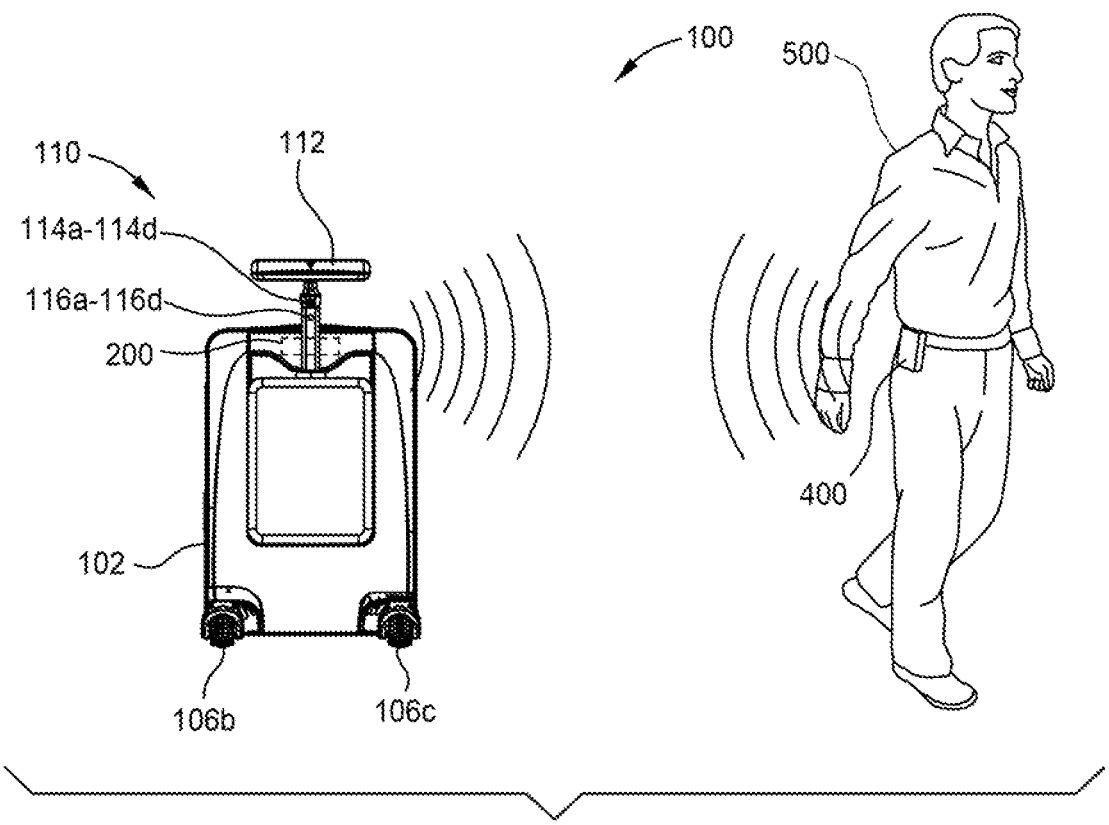
FIG. 2D illustrates a schematic view of a self-driving system following a user in a radio wave following mode, according to one implementation.

FIG. 2D illustrates a schematic view of the self-driving system 100 following the user 500 in a radio wave following mode, according to one implementation. The self-driving system 100 is following the user 500 from a rear position. The user 500 is wearing the mobile ultra-wideband device 400 on a belt of the user 500. The mobile ultra-wideband device 400 is a user-wearable belt clip device. In one example, the mobile ultra-wideband device 400 includes a belt clip attached to the waist of the user 500, such as a belt clip attached to the belt of the user 500. By attaching the mobile ultra-wideband device 400 to the waist of the user 500, the onboard ultra-wideband device 200 may track and follow the user 500 without the user's body obstructing a communication path between the onboard ultra-wideband device and the mobile ultra-wideband device 400.

When the self-driving system 100 is in the radio wave following mode, the onboard ultra-wideband device 200 and the mobile ultra-wideband device 400 communicate and the onboard ultra-wideband device 200 determines a position of the user 500 relative to the piece of luggage 102 using the angle of arrival and timing mechanisms described above. In one example, the onboard ultra-wideband device 200 continuously receives information regarding the position of the user 500 from the mobile ultra-wideband device 400. In response to the information received by the onboard ultra-wideband device, the self-driving system 100 instructs one or more motorized wheels 106a-d to move the luggage 102 in a given direction. In one example, and in response to the information received by the onboard ultra-wideband device 200 from the mobile ultra-wideband device 400, control unit 204 of the self-driving system 100 instructs the one or more motorized wheels 106a-106d to move the luggage 102 in a given direction towards the mobile ultra-wideband device 400.

The wavelength of the flat beams of light 140 (such as laser beams) emitted by the laser emitters 116a-116d is within a range of 800 nm to 815 nm, such as 803 nm to 813 nm. The self-driving system 100 may operate in the vision following mode in differing environments involving light of differing wavelengths. As an example, the self-driving system 100 may operate in an environment, such as an indoor environment, having light at wavelength within a range of 450 nm to 750 nm, which does not interfere with the wavelength of the flat beams of light 140 emitted by the laser emitters 116a-116d. The self-driving system 100 can detect light emitted by the laser emitters 116a-116d and reflected off objects, resulting in unobstructed images taken by the proximity cameras 114a-114d. The self-driving system 100 may also operate in an environment having one or more environmental conditions that obstruct the images taken by the proximity cameras 114a-114d. As an example, the self-driving system 100 may operate in an environment, such as an outdoor environment, having light (such as sunlight) at a wavelength of 296 nm to 1300 nm, which may overlap with and interfere with the wavelength of the flat beams of light 140 emitted by the laser emitters 116a-116d. When such interference occurs, the self-driving system 100 may not be able to detect light reflected off of objects (such as the first horizontal line 142 of light reflected off of the user 500), resulting in obstructed images taken by the proximity cameras 114a-114d.

The self-driving system 100 is configured to switch between the vision following mode and the radio wave following mode. The self-driving system 100 is configured to automatically switch from the vision following mode to the radio wave following mode upon detection of an obstructed image taken by the proximity cameras 114a-114d. The self-driving system 100 is configured to automatically switch from the radio wave following mode to the vision following mode upon detection of an unobstructed image taken by the proximity cameras 114a-114d. In one example, the one or more proximity cameras 114a-114d of the self-driving system 100 are configured to take one or more images (such as the image 150) having reflected light emitted by the laser emitters 116a-116d, the user 500, and/or object 510 while the self-driving system 100 is in the radio wave following mode.

By automatically switching between the vision following mode and the radio wave following mode, the self-driving system 100 is able to continuously follow the user 500 while the user 500 moves between differing environments (such as an indoor environment and an outdoor environment), some of which may have environmental conditions that obstruct images taken by the proximity cameras 114a-114d. The automatic switching of the self-driving system 100 also allows the user to forego wearing a device (such as the mobile ultra-wideband device 400) during the vision following mode and indicate when the user should wear the mobile ultra-wideband device 400 during the radio wave following mode.

Figure 2E:
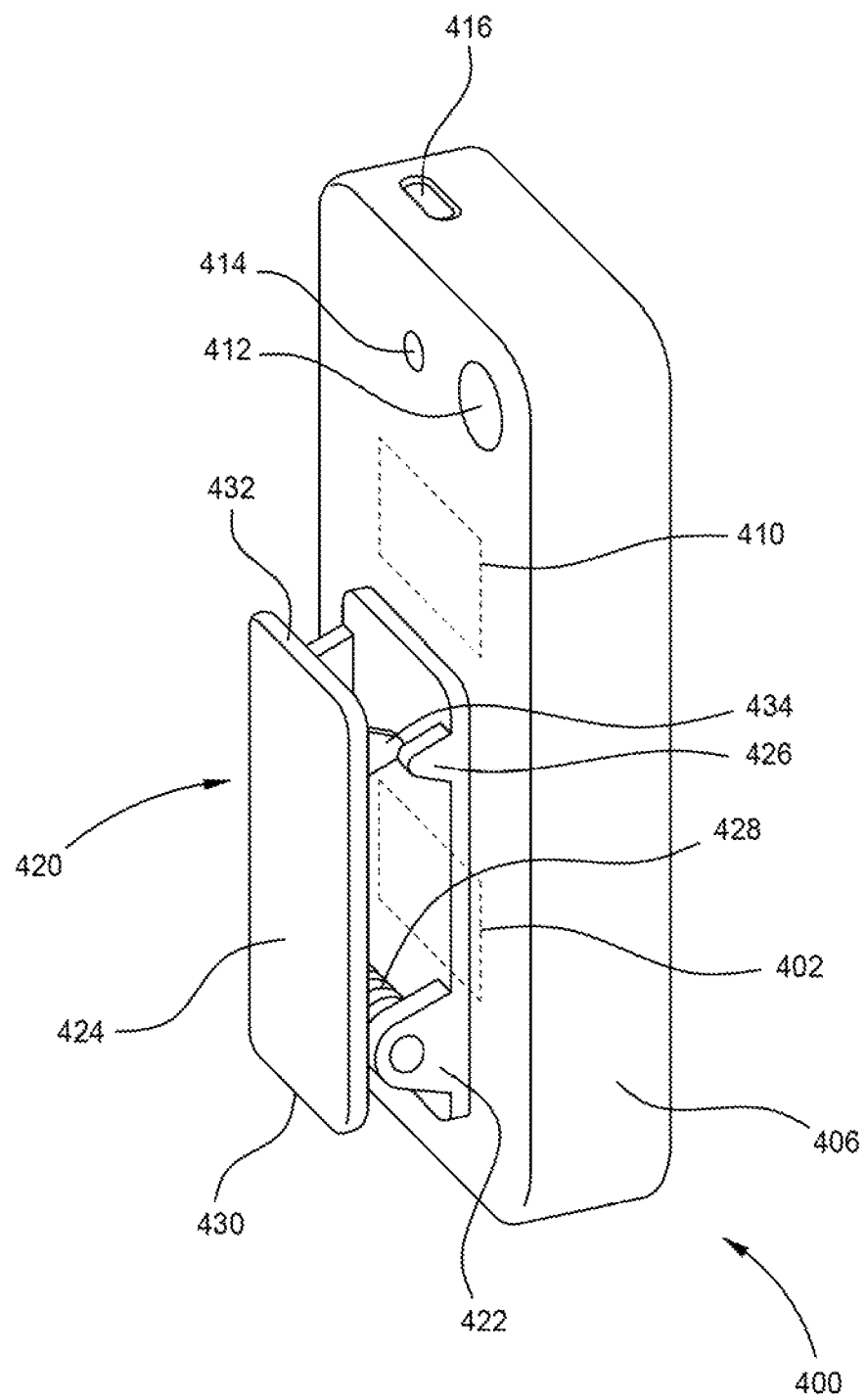
FIG. 2E is an enlarged schematic view of a mobile ultra-wideband device illustrated in FIG. 2D, according to one implementation.

FIG. 2E is an enlarged view of the mobile ultra-wideband device 400 illustrated in FIG. 2D, according to one implementation. When the self-driving system 100 is in the radio wave following mode, one or more radio wave signals are transmitted between the mobile ultra-wideband device 400 and the onboard ultra-wideband device 200. Using the transmitted radio wave signals, the self-driving system 100 determines a position of the mobile ultra-wideband device 400 relative to the onboard ultra-wideband device 200. In one example, the mobile ultra-wideband device 400 is prompted to transmit ultra-wideband signals from a transmitter 402 and to the onboard ultra-wideband device 200 in the radio wave following mode. The transmitter 402 is located within a housing 406 of the mobile ultra-wideband device 400. The mobile ultra-wideband device 400 includes a battery 410 that supplies power to the transmitter 402. A user (such as the user 500) may control the power supplied by the battery 410 to the transmitter 402 with a power button 412. The mobile ultra-wideband device 400 also includes a charging outlet 416 for recharging the battery 410. The charging outlet 416 includes an opening in the housing 406 to allow for an external charging device (such as a USB-C connector) to be inserted into the housing 406 in order to recharge the battery 410. The charging outlet 416 is disposed on a top of the housing 406.

The mobile ultra-wideband device 400 also includes a status light 414. The status light 414 is connected to the battery 410 within the housing 406 and determines the power status of the battery 410 of the mobile ultra-wideband device 400 while active. In one example, the status light 414 is a light-emitting diode (LED) which emits different colored lights depending on the power status of the battery. In one example, the status light 414 emits a green-colored light after detecting that the battery 410 is above a storage voltage threshold and a red-colored light after detecting that the battery 410 below the storage voltage threshold. The status light 414 is disposed on the housing 406 to allow a user to view the power status of the mobile ultra-wideband device 400. In one example, the status light 414 is disposed on the same side of the housing 406 as the power button 412, and adjacent to the power button 412.

The mobile ultra-wideband device 400 of FIG. 2E also illustrates a mounting clip assembly 420. The mounting clip assembly 420 allows a user to mount the mobile ultra-wideband device 400 to a belt and/or waist of a user. The mounting clip assembly 420 includes a clip 424 pivotably mounted to the housing 406 of the mobile ultra-wideband device 400. The clip 424 includes a mounting end 430 and an engaging end 432. The clip 424 is pivotably mounted at the mounting end 430 to one or more first protrusions 422 protruding from the housing 406. The engaging end 432 of the clip 424 is biased towards the housing 406 by a spring 428 such that one or more engaging protrusions 434 of the clip 424 engage with one or second protrusions 426 that protrude from the housing 406.

A user (such as the user 500) may couple the mobile ultra-wideband device 400 to a belt of the user by applying a pushing force to the mounting end 430 of the clip 424 (or applying a pulling force to the engaging end 432 of the clip 424) such that the engaging end 432 of the clip 424 is rotated away from the second protrusions 426. A user can slide a belt between the clip 424 and the housing 406 and release the force on the lower end of the clip 424 to secure the mobile ultra-wideband device 400 to the belt.

Figure 3:
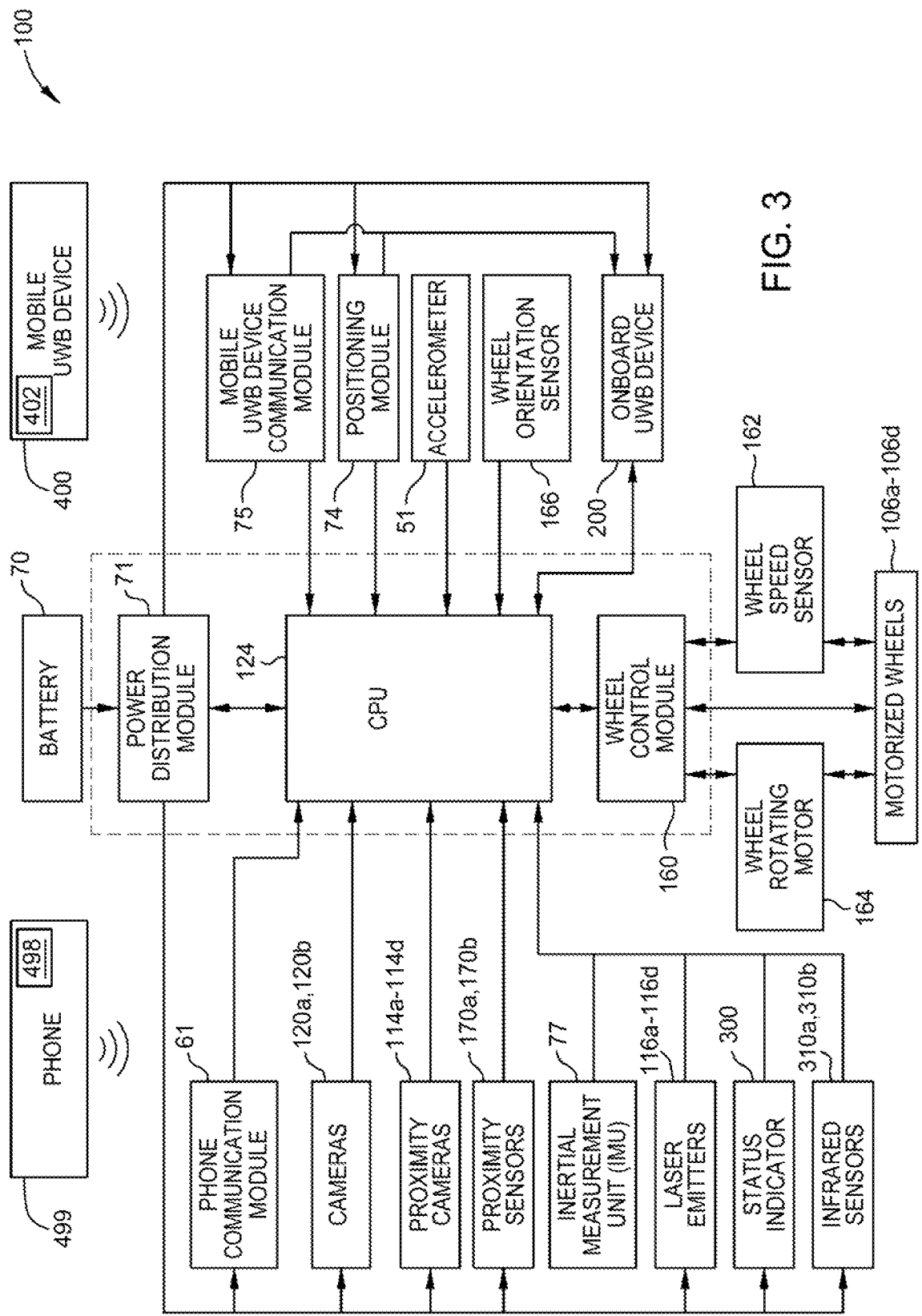
FIG. 3 illustrates a schematic view of the self-driving system illustrated in FIGS. 1A-1C, according to one implementation.

FIG. 3 illustrates a schematic view of the self-driving system 100 illustrated in FIGS. 1A-1C, according to one implementation. The self-driving system 100 includes a battery 70 in communication with a power distribution module 71. The power distribution module 71 distributes power supplied by the battery 70 to the components of the self-driving system 100.

The self-driving system 100 includes a central processing unit ("CPU") 124. The CPU 124 is in communication with a cellular phone communication module 61 and a mobile ultra-wideband device communication module 75. In one example, a mobile ultra-wideband device 400 having a transmitter 402 is used to communicate with the mobile ultra-wideband device communication module 75. In one example, a cellular phone 499 having a transmitter 498 is used to communicate with the cellular phone communication module 61. The transmitter 498 is configured to transmit ultra-wideband signals. Both the mobile ultra-wideband device 400 having a transmitter 402 and the cellular phone 499 having a transmitter 498 may communicate with the communication modules 61, 75, respectively, via ultra-wideband, radio frequency identification (active and/or passive), Bluetooth (low energy), WiFi, and/or any other form of communication known in the art. The cellular phone 499 and the mobile ultra-wideband device 400 are configured to receive information from the CPU 124 regarding the operation of the self-driving system 100. The mobile ultra-wideband device communication module 75 and the cellular phone communication module 61 may each be a separate unit from, or integrated into, the onboard ultra-wideband device 200. The cellular phone 499 may perform one or more of the same functions as the mobile ultra-wideband device 400.

The CPU 124 of the self-driving system 100 is configured to switch between the vision following mode and the radio wave following mode, each of which is discussed above. The CPU 124 of the self-driving system 100 is configured to automatically switch between the vision following mode and the radio wave following mode, as discussed above.

When the self-driving system 100 is in the vision following mode, the CPU 124 is configured receive from the one or more proximity cameras 114a-114d one or more images (such as image 150) of a target (such as user 500) that include the light reflected off of the target (such as the first horizontal line 142 of light that is reflected off of the user 500). In response to receiving the images from the one or more proximity cameras 114a-114d, the CPU 124 is configured to determine a distance (such as the distance $D_1$) to the target based on a height (such as the first height $h_1$) at which the light emitted by a laser emitter 116a-116d is reflected off of the target. The CPU 124 is configured to generate instructions regarding a position of the piece of luggage 102 in relation to the user 500 using the distance $D_1$ and/or the first height $h_1$. The present disclosure contemplates that the self-driving system 100 described throughout the present disclosure may include a graphics processing unit (GPU) that includes one or more of the aspects, features, and/or components of the CPU 124 described throughout the present disclosure. The self-driving system 100 may include a GPU that performs one or more of the functions performed by the CPU 124 described throughout the present disclosure. As an example, the self-driving system 100 may include a GPU that is configured to receive from the one or more proximity cameras 114a-114d one or more images (such as image 150) of a target (such as user 500) that include the light reflected off of the target, when the self-driving system 100 is in the vision following mode.

When in the radio wave following mode, the CPU 124 receives information from one or more of the onboard ultra-wideband device 200 (such as from the control unit 204) and/or the mobile ultra-wideband device 400 regarding a position of the mobile ultra-wideband device 400 relative to the piece of luggage 102. The CPU 124 uses the information regarding the position of the mobile ultra-wideband device 400 relative to the piece of luggage 102 to determine a distance between the piece of luggage 102 and the mobile ultra-wideband device 400. The CPU 124 is configured to generate instructions regarding a position of the piece of luggage 102 in relation to the user 500 using the information regarding the position of the mobile ultra-wideband device 400 relative to the piece of luggage 102 and/or the determined distance between the piece of luggage 102 and the mobile ultra-wideband device 400.

In one example, the CPU 124 and the control unit 204 of the onboard ultra-wideband device 200 are separate units. In one example, the CPU 124 and the control unit 204 are integrated into a single processing unit disposed on the piece of luggage 102. In one example, the CPU 124 and the onboard ultra-wideband device 200 are separate units. In one example, the CPU 124 and the onboard ultra-wideband device 200 are integrated into a single processing unit disposed on the piece of luggage 102.

The CPU 124 is configured to automatically switch from the vision following mode to the radio wave following mode upon detecting an obstructed image received from the proximity cameras 114a-114d, such as an obstructed image that is obstructed by environmental conditions. As an example, the CPU 124 automatically switches to the radio wave following mode if the CPU 124 receives an image in which the CPU 124 cannot detect light reflected off of the target (such as the user 500). The CPU 124 is configured to automatically switch from the radio wave following mode to the vision following mode when the CPU 124 detects an unobstructed image received from the proximity cameras 114a-114d. The CPU 124 is configured to automatically switch from the vision following mode to the radio wave following mode upon moving from an indoor environment to an outdoor environment. The CPU 124 is configured to automatically switch from the radio wave following mode to the vision following mode upon moving from an outdoor environment to an indoor environment.

The CPU 124 sends the generated instructions regarding the position of the piece of luggage 102 in relation to the user 500 to a wheel control module 160. In the vision following mode, the CPU 124 generates and sends instructions for the wheel control module 160 to move the piece of luggage 102 in a given direction at a given speed towards the closest target (such as user 500) in the one or more images received from the proximity cameras 114a-114d. In the radio wave following mode, the CPU 124 generates and sends instructions for the wheel control module 160 to move the piece of luggage 102 in a given direction at a given speed towards the mobile ultra-wideband device 400 worn on the belt and/or waist of the user 500.

Upon receiving instructions from the CPU 124, the wheel control module 160 is configured to control the direction and/or speed of the piece of luggage 102 relative to the user 500 and/or the surrounding environment based on the instructions received from the CPU 124. The wheel control module 160 communicates with a wheel speed sensor 162 and a wheel rotating motor 164. The wheel control module 160 also communicates information regarding the one or more motorized wheels 106a-106d to the CPU 124. Although only one wheel control module 160 is show, each of the one or more motorized wheels 106a-106d may include a separate wheel control module 160 in communication with the CPU 124. Each of the one or more motorized wheels 106a-106d may include a separate wheel rotating motor 164. In one example, the wheel control module 160 can be integrated into the CPU 124 as a single processing unit. In one example, the CPU 124 includes a single wheel control module 160 to control each of the one or more motorized wheels 106a-106d.

The wheel control module 160 controls the direction and/or speed of the piece of luggage 102 by increasing, decreasing, or stopping power supplied to one or more of the motorized wheels 106a-106d and/or by controlling the direction of the one or more motorized wheels 106a-106d with the wheel rotating motor 164. In one example, one or more of the power distribution module 71, the CPU 124, the onboard ultra-wideband device 200, and the wheel control module 160 are integrated into a single processing unit coupled to the luggage 102.

A positioning module 74 communicates information regarding the position of the luggage 102 to the CPU 124, the onboard ultra-wideband device 200, and/or the user (via the cellular phone 499 and/or the mobile ultra-wideband device 400 for example). The positioning module 74 may be a separate unit or integrated in to the onboard ultra-wideband device 200. The positioning module 74 may include GPS (outdoor), WiFi access points (indoor), and/or Bluetooth beacons (indoor) so that the user can find the location of the self-driving system 100 at any time, such as in the event that the self-driving system 100 is lost. An accelerometer 51 is configured to communication information regarding the overall acceleration and/or speed of the self-driving system 100 to the CPU 124. A wheel orientation sensor 166 is configured to communicate information regarding the orientation of the one or more motorized wheels 106a-d to the CPU 124. The CPU 124 is also in communication with an inertial measurement unit (IMU) 77, and the proximity sensors 170a, 170b. The IMU 77 communicates information regarding the dynamic movements of the self-driving system 100, such as the pitch, roll, yaw, acceleration, and/or angular rate of the self-driving system 100 to the CPU 124. In one example, when the IMU 77 detects that the self-driving system 100 is tilting or about to fall over, the CPU will instruct a wheel control module 160 to cut power to one or more of the motorized wheels 106a-d to prevent the self-driving system from falling over. The proximity sensors 170a, 170b are configured to communicate information regarding the presence of targets near the self-driving system 100 to the CPU 124.

The CPU 124 is in communication with the status indicator 300 and the one or more infrared sensors 310. The CPU 124 is configured to generate instructions regarding a status of the piece of luggage 102. The status of the piece of luggage 102 is determined by the CPU 124 based on information received from the various components (e.g., one or more of cameras 120a, 120b, proximity sensors 170a, 170b, proximity cameras 114a-114d, laser emitters 116a-116d, the various modules 61, 74, 75, 160, the mobile ultra-wideband device 400, and/or the onboard ultra-wideband device 200) of the self-driving system 100. The CPU 124 is configured to switch between the vision following mode, the radio wave following mode, and a manual pull mode where the motorized wheels 106a-106d are not powered and the user 500 pulls the piece of luggage 102 using the handle 110. The CPU 124 is configured to automatically switch to the manual pull mode when the infrared sensors 310a, 310b (illustrated in FIG. 1C) detect a hand of the user 500 when the hand is close to, or gripping, the upper portion 112a of the pull rod 112 of the handle 110. In response to detecting a hand, the infrared sensors 310a, 310b send one or more signals to the CPU 124. In one example, the infrared sensors 310a, 310b detect light obstruction and/or heat signals from the hand of a user 500.

When the self-driving system 100 is in the vision following mode, the CPU 124 generates and sends instructions to the status indicator 300 (illustrated in FIG. 1C) that instruct the status indicator 300 to emit a first light indicator. The first light indicator can include patterned light indications and/or colored light indications. In one example, the first light indicator includes one or more of an uninterrupted light emission and/or a blinking light emission. In one example, the first light indicator includes a first color, such as purple, green, blue, red, orange, or yellow. In one example, the status indicator 300 emits an uninterrupted green light in the vision following mode.

When the self-driving system 100 is in the radio wave following mode, the CPU 124 generates and sends instructions to the status indicator 300 that instruct the status indicator 300 to emit a second light indicator. The second light indicator is different than the first light indicator. As an example, the second light indicator is different than the first light indicator with respect to patterned light indications emitted and/or colored light indications emitted. In one example, the status indicator 300 emits a blinking green light in the radio wave following mode.

When the self-driving system 100 is in the manual pull mode, the CPU 124 generates and sends instructions to the status indicator 300 that instruct the status indicator 300 to emit a third light indicator. The third light indicator is different than the first light indicator and the second light indicator. As an example, the third light indicator is different than the first light indicator and the second light indicator with respect to patterned light indications emitted and/or colored light indications emitted. In one example, the status indicator 300 emits an uninterrupted blue light in the manual pull mode.

The CPU 124 may also generate and send instructions to the status indicator that instruct the status indicator 300 to emit additional different light indicators. In one example, the CPU 124 generates and sends instructions to the status indicator that instruct the status indicator 300 to emit a fourth light indicator in response to one or more signals received from the cameras 120a, 120b that indicate one or more of the cameras 120a, 120b are taking photographs and/or video. In one example, the status indicator 300 emits a purple light when the cameras 120a, 120b are taking photographs and/or video. The purple light is uninterrupted if the self-driving system 100 is in the manual pull mode. The purple light is blinking if the self-driving system 100 is in the vision following mode or the radio wave following mode.

In one example, the CPU 124 generates and sends instructions to the status indicator that instruct the status indicator 300 to emit a fifth light indicator in response to one or more images received from the proximity cameras 114a-114d and information received from the onboard ultra-wideband device 200 that indicate the self-driving system 100 is unable to follow the user 500 in either the vision following mode or the radio wave following mode. In one example, the fifth light indicator indicates an error. In one example, the status indicator 300 emits an uninterrupted red light if the self-driving system 100 is unable to follow the user 500 in either the vision following mode or the radio wave following mode.

The first light indicator, second light indicator, third light indicator, fourth light indicator, and fifth light indicator are different from each other with respect to patterned light indications emitted and/or colored light indications emitted. Each of the first light indicator, second light indicator, third light indicator, fourth light indicator, and fifth light indicator may include one or more of an uninterrupted light emission and/or a blinking light emission. Each of the first light indicator, second light indicator, third light indicator, fourth light indicator, and fifth light indicator may include a color such as purple, green, blue, red, orange, or yellow.

The different light indicators displayed by the status indicator 300 allow the user to easily determine the various statuses and/or modes of the self-driving system 100. For example, if the status indicator 300 is emitting a blinking green light corresponding to the self-driving system 100 being in the radio wave following mode, the user can determine that the mobile ultra-wideband device 400 needs to be worn by the user and powered on.

Benefits of the present disclosure include a vision following mode capable of following a user without the user wearing a mobile device; a self-driving system capable of automatically switching between following modes in response to changing environmental conditions; a mobile ultra-wideband device capable of communicating with an onboard ultra-wideband device with reduced or eliminated blocking by the body of the user; and a status indicator that indicates various statuses and/or modes of a self-driving system. Aspects of the present disclosure include a central processing unit configured to receive information and images from a number of self-driving system components, generate instructions regarding the status and/or position of a piece of luggage, and automatically switch between one or more following modes; a mobile ultra-wideband device with a mounting clip for attaching the mobile ultra-wideband device to the belt and/or waist of a user of a self-driving system; a status indicator having a light-emitting diode to emit light indicators; and one or more infrared sensors capable of interacting with the user of a self-driving system. It is contemplated that one or more of these aspects disclosed herein may be combined. Moreover, it is contemplated that one or more of these aspects may include some or all of the aforementioned benefits.

While the foregoing is directed to embodiments of the present disclosure, other and further embodiments of the present disclosure may be devised without departing from the basic scope thereof. The present disclosure also contemplates that one or more aspects of the embodiments described herein may be substituted in for one or more of the other aspects described. The scope of the present disclosure is determined by the claims that follow.

What is claimed is:

1. A self-driving system, comprising:
   a piece of luggage, the piece of luggage comprising:
      one or more motorized wheels,
      an onboard ultra-wideband device having a control unit and one or more transceivers,
      one or more laser emitters configured to shoot light towards a target, and
      one or more proximity cameras configured to take one or more images of the target, the one or more images including light reflected off of the target, and each of the one or more proximity cameras having an optical filter;
   a central processing unit configured to:
      switch between a vision following mode and a radio wave following mode,
      determine a distance to the target, and
      generate instructions regarding a position of the piece of luggage;
   wherein in the vision following mode the central processing unit is configured to receive from the one or more proximity cameras one or more images of the target that include the light reflected off of the target; and
   wherein in the radio wave following mode the central processing unit is configured to receive information from the onboard ultra-wideband device.

2. The self-driving system of claim 1, wherein the control unit of the onboard ultra-wideband device and the central processing unit are integrated into a single processing unit.

3. The self-driving system of claim 1, further comprising a wheel control module, wherein in the vision following mode the central processing unit determines the distance to the target using a height at which the light is reflected off of the target, and the wheel control module receives the instructions generated by the central processing unit regarding the position of the piece of luggage, and in response to the received instructions the wheel control module moves the piece of luggage in a given direction.

4. The self-driving system of claim 1, wherein the central processing unit is configured to automatically switch from the vision following mode to the radio wave following mode upon detecting an obstructed image.

5. The self-driving system of claim 4, wherein the obstructed image is obstructed by an environmental condition.

6. The self-driving system of claim 1, wherein the central processing unit is configured to automatically switch from the radio wave following mode to the vision following mode upon detecting an unobstructed image.

7. The self-driving system of claim 1, wherein the central processing unit is configured to automatically switch from the vision following mode to the radio wave following mode upon moving from an indoor environment to an outdoor environment.

8. The self-driving system of claim 1, wherein the central processing unit is configured to automatically switch from the radio wave following mode to the vision following mode upon moving from an outdoor environment to an indoor environment.

9. The self-driving system of claim 1, further comprising:
a mobile ultra-wideband device with a transmitter configured to transmit a signal to the one or more transceivers of the onboard ultra-wideband device;
a wheel control module; and
wherein in the radio wave following mode the central processing unit determines the distance to the target using the signal transmitted from the transmitter to the one or more transceivers, and the wheel control module receives the instructions generated by the central processing unit regarding the position of the piece of luggage, and in response to the received instructions the wheel control module moves the piece of luggage in a given direction.

10. The self-driving system of claim 9, wherein the mobile ultra-wideband device comprises a belt clip.

11. The self-driving system of claim 1, wherein each of the one or more proximity cameras includes a wide-angle lens.

12. A self-driving system, comprising:
a piece of luggage, the piece of luggage comprising:
one or more motorized wheels,
an onboard ultra-wideband device having a control unit and one or more transceivers,
one or more laser emitters configured to shoot light towards a target, and
one or more proximity cameras configured to take one or more images of the target, the one or more images including light reflected off of the target, and each of the one or more proximity cameras having an optical filter;
a mobile ultra-wideband device, the mobile ultra-wideband device comprising:
a housing,
a transmitter configured to transmit a signal to the one or more transceivers of the onboard ultra-wideband device,
a battery, and
a mounting clip; and
a central processing unit configured to:
switch between a vision following mode and a radio wave following mode,
determine a distance to the target, and
generate instructions regarding a position of the piece of luggage;
wherein in the vision following mode the central processing unit is configured to receive from the one or more proximity cameras one or more images of the target that include the light reflected off of the target; and
wherein in the radio wave following mode the central processing unit is configured to receive information from the onboard ultra-wideband device.

13. The self-driving system of claim 12, wherein the mobile ultra-wideband device further comprises a charging outlet to recharge the battery.

14. The self-driving system of claim 12, wherein the mobile ultra-wideband device further comprises a status light, and the status light is configured to indicate a power status of the mobile ultra-wideband device.

15. The self-driving system of claim 12, wherein the mounting clip of the mobile ultra-wideband device is a belt clip.

16. The self-driving system of claim 15, wherein the housing comprises one or more protrusions that protrude from the housing, and the mounting clip comprises a clip that is pivotably mounted to the one or more protrusions.

17. The self-driving system of claim 16, wherein the central processing unit is configured to automatically switch from the vision following mode to the radio wave following mode upon detecting an obstructed image.

18. A self-driving system, comprising:
a piece of luggage, the piece of luggage comprising:
one or more motorized wheels,
an onboard ultra-wideband device having a control unit and one or more transceivers,
one or more laser emitters configured to shoot light towards a target, and
one or more proximity cameras configured to take one or more images of the target, the one or more images including light reflected off of the target, and each of the one or more proximity cameras having an optical filter;
a status indicator;
a central processing unit configured to:
switch between a vision following mode and a radio wave following mode,
determine a distance to the target, and
generate instructions regarding a status of the piece of luggage;
wherein in the vision following mode the central processing unit is configured to receive from the one or more proximity cameras one or more images of the target that include the light reflected off of the target, and the instructions generated by the central processing unit instruct the status indicator to emit a first light indicator; and
wherein in the radio wave following mode the central processing unit is configured to receive information from the onboard ultra-wideband device, and the instructions generated by the central processing unit instruct the status indicator to emit a second light indicator that is different than the first light indicator.

19. The self-driving system of claim 18, wherein the status indicator comprises a light-emitting diode, the first light indicator comprises an uninterrupted light emission, and the second light indicator comprises a blinking light emission.

20. The self-driving system of claim 18, wherein the status indicator comprises a light-emitting diode, the first light indicator comprises a first color, and the second light indicator comprises a second color that is different than the first color.

21. The self-driving system of claim 18, wherein:
the self-driving system further comprises one or more infrared sensors;
the piece of luggage comprises a handle;
the central processing unit is further configured to receive information from the one or more infrared sensors, and is configured to switch between the vision following mode, the radio wave following mode, and a manual pull mode; and
the one or more infrared sensors and the status indicator are disposed on the handle of the piece of luggage.

22. The self-driving system of claim 21, wherein the status indicator comprises a light-emitting diode, and in the manual pull mode the instructions generated by the central processing unit instruct the status indicator to emit a third light indicator that is different than the second light indicator and the third light indicator.

* * * * *